United States Patent
Shannigrahi et al.

(10) Patent No.: US 9,701,585 B2
(45) Date of Patent: Jul. 11, 2017

(54) ELECTRO-OPTIC CERAMIC MATERIALS

(71) Applicant: Agency for Science, Technology and Research, Singapore (SG)

(72) Inventors: Santiranjan Shannigrahi, Singapore (SG); Chee Kiang Ivan Tan, Singapore (SG); Hong Fei Liu, Singapore (SG); Kui Yao, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/765,998

(22) PCT Filed: Feb. 6, 2014

(86) PCT No.: PCT/SG2014/000050
§ 371 (c)(1),
(2) Date: Aug. 5, 2015

(87) PCT Pub. No.: WO2014/123488
PCT Pub. Date: Aug. 14, 2014

(65) Prior Publication Data
US 2015/0376068 A1    Dec. 31, 2015

(30) Foreign Application Priority Data
Feb. 6, 2013  (SG) .................................. 201300947

(51) Int. Cl.
*C04B 35/495*    (2006.01)
*C04B 35/50*    (2006.01)
(Continued)

(52) U.S. Cl.
CPC ............ *C04B 35/50* (2013.01); *C01G 33/006* (2013.01); *C04B 35/495* (2013.01);
(Continued)

(58) Field of Classification Search
CPC .............. C04B 35/495; C04B 41/5051; C04B 2235/3251; C04B 2235/3255
See application file for complete search history.

(56) References Cited

U.S. PATENT DOCUMENTS

2008/0151358 A1    6/2008  Jiang et al.
2010/0027096 A1    2/2010  Pan

FOREIGN PATENT DOCUMENTS

CN          102268256 A    12/2011
WO          WO-2014/123488    8/2014

OTHER PUBLICATIONS

Gao et al. Microstructure and electrical properties of La-modified K0.5Na0.5NbO3 lead-free piezoelectric ceramics. J. Phys. D: Appl. Phys. 42 (2009).*

(Continued)

*Primary Examiner* — Noah Wiese
(74) *Attorney, Agent, or Firm* — Schwegman Lunberg & Woessner, P.A.

(57) ABSTRACT

The present invention provides a product and manufacturing method for electro-optic ceramic material having the composition $(A'(1-y)A''y)_{1-x}Ln_xM_{(1-2x/5)}O_3$ wherein $0<x<0.1$; $0<y<1$; A' and A" are independently, alkali metals; Ln is a lanthanide metal; and M is a transition metal. The present invention provides a product and manufacturing method for an electro-optic device that is operable at room temperature and the properties of which are tunable by an applied external electric field.

18 Claims, 5 Drawing Sheets

(51) Int. Cl.
C04B 35/626 (2006.01)
C01G 33/00 (2006.01)
G02F 1/00 (2006.01)
G02F 1/055 (2006.01)

(52) U.S. Cl.
CPC ...... *C04B 35/62675* (2013.01); *G02F 1/0018* (2013.01); *G02F 1/055* (2013.01); *C04B 2235/3201* (2013.01); *C04B 2235/3224* (2013.01); *C04B 2235/3227* (2013.01); *C04B 2235/3251* (2013.01); *C04B 2235/3255* (2013.01); *C04B 2235/768* (2013.01); *C04B 2235/77* (2013.01); *C04B 2235/81* (2013.01); *C04B 2235/9653* (2013.01)

(56) References Cited

OTHER PUBLICATIONS

Abstract of Murty et al. Ferroelectric behaviour of lanthanum doped (NaK)NbO3 ceramics. Ferroelectrics. vol. 82, Issue 1, 1988. p. 141-147.*

"International Application No. PCT/SG2014/000050, International Search Report and Written Opinion mailed Mar. 26, 2014", (Mar. 26, 2014), 10 pgs.

Gao, Daojiang, et al., "Microstructure and electrical properties of La-modified K0.5Na0.5NbO3 lead-free piezoelectric ceramics", Journal of Physics D: Applied Physics, 42 035411, (2009), 1-9.

Hao, Jigong, et al., "Relaxor behavior and dielectric properties of (La, Ta)-modified (K0.5Na0.5)NbO3 lead-free ceramics", Journal of Alloys and Compounds, 484(1-2), (2009), 233-238.

Murty, S. Narayana, et al., "Ferroelectric behaviour of lanthanum doped (NaK)Nb03 ceramics", Ferroelectrics, 82(1), (1988), 141-147.

Murty, S. Narayana, et al., "Modified (NaK)NbO3 ceramics for transducer applications", Ferroelectrics, 102(1), (1990), 243-247.

Murty, S. Narayana, et al., "Phase transitions in europium doped (NAK) NBO3 ceramics", Ferroelectrics, 94(1), (1989), 285-290.

Murty, S. Narayana, et al., "Piezoelectric (NaK)NbO3 ceramics for ultrasonic delay line applications", Ferroelectrics, 154(1), (1994), 171-176.

Sun, Haiqin, et al., "Green and red emission for (K0.5Na0.5)NbO3:Pr ceramics", Journal of Applied Physics, 111, 046102, (2012), 3 pgs.

Zuo, Ruzhong, et al., "Sintering and electrical properties of Na0.5K0.5NbO3 ceramics modified with lanthanum and ironoxides", Journal of Physics and Chemistry of Solids, 70, (2009), 750-754.

* cited by examiner

ELECTRO-OPTIC CERAMIC MATERIALS

PRIORITY CLAIM TO RELATED APPLICATIONS

This application is a U.S. national stage application filed under 35 U.S.C. §371 from International Application Serial No. PCT/SG2014/000050, which was filed 6 Feb. 2014, and published as WO 2014/123488 on 14 Aug. 2014, and which claims priority to Singapore Application No. 201300947-7, filed 6 Feb. 2013, which applications and publication are incorporated by reference as if reproduced herein and made a part hereof in their entirety, and the benefit of priority of each of which is claimed herein.

TECHNICAL FIELD

The present invention generally relates to a ceramic material with electro-optic properties. The present invention also relates to a method of fabricating such a ceramic material. The present invention also relates to an electro-optic device comprising the ceramic material and a method for fabrication of such a device.

BACKGROUND

Transparent ceramics have recently acquired a high level of interest. In particular, electro-optic ceramics, where the property of the ceramic material can be tuned by an externally applied electric field, have found extensive applications in devices such as optical fibres for guided light wave transmission, optical switches, variable optical attenuators, polarization controllers, tuneable optical filters, optical shutters and night vision goggles.

Electro-optic ceramics can be made of a single crystal or be polycrystalline. Single-crystal electro-optic ceramics may be largely defect-free and display better electro-optic performance. However, the processing of a single crystal is extremely expensive. In contrast, polycrystalline materials are low cost and display good electro-optic effects and ceramic ruggedness. However, the optical transparency of polycrystalline materials is limited by light scattering caused by their microstructural features. Since the extent of light scattering depends on the wavelength of the incident radiation or light, polycrystalline electro-optic ceramics that have scattering centres on a similar spatial scale to the wavelengths of visible light, that is, on the order of hundreds of nanometers, display the most light scattering and therefore the least transparency.

Among the polycrystalline electro-optic ceramics, the most widely used are based on the $PbTiO_3$—$PbZrO_3$ (PZT) solid solution. Although PZT ceramics show good electro-optical properties, good transparency, ceramic ruggedness and a low cost of production, most of the ceramic materials within the PZT family are composed of about 60 wt % of lead, which raises ecological concerns. Some countries have legislated to replace PZT with lead-free ceramics, since lead is a toxic element that may affect the human health and the environment. Due to this, recent research on electro-optic ceramics has focused on the development of lead-free electro-optic ceramics.

Among the lead free ceramics developed so far, the $K_{0.5}Na_{0.5}NbO_3$ (KNN) solid solution has received particular interest as it has displayed the most promising results. However, KNN ceramic materials suffer major drawbacks in its processing steps. For example, the alkaline elements undergo sublimation at the high temperatures required to achieve adequate densification, changing the initial stoichiometry considerably. Since the properties of the materials are highly sensitive to stoichiometry, it is difficult to control the fabrication process to achieve precise compositions of the materials.

Densification is a crucial step in obtaining highly transparent and efficient electro-optical ceramic materials, hence there have been many attempts to improve this property. One way to improve densification is to reduce the particle size of the synthesised powders. Conventional solid-state ceramic synthesis methods do not achieve considerable reduction of particle size, hence KNN-based compositions have been obtained through various soft chemistry routes. However, these methods are often costly, time-consuming, require strict control of the reaction conditions and are generally inefficient.

There is therefore a need to provide an electro-optic material that overcomes, or at least ameliorates, one or more of the disadvantages described above. Further, there is a need to provide an electro-optical device that comprises the electro-optical material, that is ecologically safe, has high transparency, displays high and fast electro-optical effects, a wide window of transparency, is operable at room temperature and is cost-efficient. There is also a need to provide a method for fabricating such an electro-optic material and device that overcomes, or at least ameliorates, one or more of the disadvantages described above.

SUMMARY

In the first aspect, there is provided a ceramic material having the composition: $(A'_{(1-y)}A''_{y})_{(1-x)}Ln_xM_{(1-2x/5)}O_3$ wherein $0<x<0.1$; $0<y<1$; A' and A" are independently, alkali metals; Ln is a lanthanide metal; and M is a transition metal.

Advantageously, the disclosed ceramic material may be polycrystalline. This may allow the ceramic material to be a rugged ceramic, while maintaining good electro-optical properties. Further advantageously, the cost of production of the disclosed ceramic material may be significantly reduced, as polycrystalline materials are more facile to process than single-crystal materials.

Further advantageously, the disclosed ceramic material may be lead free. This may overcome the use of ecologically unsafe lead in traditional electro-optical devices. This may circumvent having to use lead which is toxic to humans and the environment. Further advantageously, the disclosed lead free ceramic material may be used to replace conventional lead-containing electro-optical materials in countries where legislation requires the replacement of lead-containing electro-optical materials with non-lead materials.

In a second aspect, there is also disclosed a method for fabricating a ceramic material comprising the step of contacting alkali metal starting materials, a lanthanide metal starting material, a transition metal starting material and oxygen according to the composition: $(A'_{(1-y)}A''_{y})_{1-x}Ln_xM_{(1-2x/5)}O_3$ wherein $0<x<0.1$; $0<y<1$; A' and A" are independently, alkali metals; Ln is a lanthanide metal; and M is a transition metal.

In one embodiment, the disclosed method may further comprise a step forming a solid solution. In another embodiment, the disclosed method may further comprise a step of calcining the solid solution. In another embodiment, the disclosed method may further comprise a step of compacting the solid solution. In yet another embodiment, the disclosed method may further comprise a step of sintering the solid solution.

Advantageously, the disclosed method may allow the material to be fabricated in a manner in which the densification of the material is improved. The densification may be improved during the formation of the solid solution, calcination, compacting or sintering steps. The improvement may be a result of adding Ln and decreasing M in the composition relative to conventional lead free electro-optic ceramic materials. The addition of Ln and decreasing of M may allow an increase in chemical potential through the material, resulting in a more efficient diffusion of atoms and molecules through the microstructure, improving the consequent densification.

Further advantageously, the disclosed method may allow the material to be fabricated at temperatures which do not alter the stoichiometry of the material. This method may therefore allow the fabrication of the material in a more predictable and consistent manner. This may in turn result in materials with a more precise composition. Further, the introduction of Ln in the disclosed method may alter the temperature in which densification occurs, further improving the densification of the material.

In a third aspect, there is also disclosed a ceramic material fabricated according to the second aspect.

In a fourth aspect, there is also disclosed an electro-optical device comprising the ceramic material disclosed according to the first or third aspect or fabricated according to the disclosed second aspect.

Advantageously, the disclosed electro-optic device comprising the disclosed ceramic material may have electro-optic properties whereby the transparency and the radiation transmission properties of the material may be efficiently changed by applying an external electric field. The change in electro-optic properties may be large and rapid. This may allow the fine-tuning of the optical properties of the material depending on its application. More advantageously, the disclosed ceramic material having this composition may absorb radiation in the UV-Vis range and the far IR range, but not in the near IR range, allowing the ceramic material to be transparent in the near IR range. Advantageously, the disclosed electro-optical device may therefore have useful applications in IR thermography.

Further advantageously, the disclosed device may be operable at room temperature. In conventional devices, the ceramic material may have required heating to display optimal electro-optic properties. Circumventing this may allow the use of the device in a variety of applications where heating of the material comprised in the device may not be possible. Further advantageously, the optical properties of the device may be tuned by applying an external field. This may allow the use of an external electric field to alter the optical properties of the device to suit a particular application.

In a fifth aspect, there is also disclosed a method for fabricating an electro-optical device comprising the ceramic material disclosed according to the first or third aspect or fabricated according to the disclosed second aspect, by providing electrodes to the ceramic material to form an electrical coupling.

DEFINITIONS

The following words and terms used herein shall have the meaning indicated:

The term "electro-optic" refers to the property of a material where the optical property changes as a result of an application of an electric field, such as a direct current or low-frequency electric field. This may be caused by forces that distort the position, orientation or shape of the molecules constituting the material. The terms "electro-optical", "electro-optic effect" and "electro-optic property" should be construed accordingly. [S&F comment: Kindly be advised that the word 'construed' is a phrase commonly used in patents to mean 'interpret']

The term "optical property" refers to the affect on a material as a result of exposure to electromagnetic radiation such as UV, visible, near IR and far IR radiation. The affect may include, but are not limited to changes in absorptivity, reflectivity, refractivity, scattering, transparency, polarisation, interference and diffraction.

The terms "transparent" and "optically transparent" can be used interchangeably to refer to the ability of a material to transmit light, allowing objects behind it to be distinctly seen.

The term "solid solution" refers to a solid-state mixture containing a minor component, or solute, uniformly distributed within the crystal lattice of the major component, or solvent. A solid solution is considered a solution rather than a compound when the crystal structure of the solvent remains unchanged by addition of the solutes, and when the mixture remains in a single homogeneous phase.

The term "densification" refers to the act of reducing the porosity of a material thereby increasing its density.

The term "grain-growth" refers to the increase in size of crystal grains (crystallites) in a material at high temperature.

The term "compaction" in reference to the fabrication of the electro-optical device, refers to the process in which fine powders of the ceramic solid solutions are made cohesive through mechanical densification under pressure with heating or without heating.

The term "calcination" in the context of the specification and in reference to the fabrication of the electro-optical device, refers to a thermal treatment process in the presence of air or oxygen to bring about a thermal decomposition, phase transition, or removal of a volatile fraction from a material. Calcination reactions usually take place at or above the thermal decomposition temperature (for decomposition and volatilization reactions) or the transition temperature (for phase transitions) but at temperatures below the melting point of the product materials.

The term "sintering" in reference to the fabrication of the electro-optical device, refers to the process where powders are fused together at temperatures that are high but below the melting point of the material in the powder. The process is characterized by atoms or molecules in the powder particles diffusing across the boundaries of the particles, fusing the particles together and creating one solid piece. Sintering controls the densification and grain growth of a material.

The term "$ABO_3$" in reference to the crystal structure of the transparent ceramic material, refers to the perovskite-like composition of the transparent ceramic material, wherein 'A' and 'B' are two cations of very different sizes. The 'A' atoms are larger than the 'B' atoms. The ideal cubic-symmetry structure has the 'B' cation in 6-fold coordination, surrounded by an octahedron of oxygen, and the 'A' cation in 12-fold cuboctahedral coordination with oxygen. The 'A' site is at the corner of the cube of the crystal structure cube, while the 'B' site is at the centre, and there is an oxygen at the middle of each face.

The term "ferroelectric" refers to the property of a material where the polarization by an electric field can be reoriented. Ferroelectric materials are a subclass of pyroelectric materials. They have the ability to switch the direction and magnitude of their spontaneous polarization by reversing the external electric field.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the terms "about" and "approximately", in the context of concentrations of components of the formulations, or where applicable, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Illustrative, non-limiting embodiments of a ceramic material in accordance with the first aspect will now be disclosed.

A ceramic material may have the composition: $(A'_{(1-y)} A''_y)_{(1-x)} Ln_x M_{(1-2x/5)} O_3$ wherein $0<x<0.1$; $0<y<1$; A' and A'' are independently, alkali metals; Ln is a lanthanide metal; and M is a transition metal.

The alkali metals A' and A'' may be the same alkali metal or two different alkali metals. The alkali metals A' and A'' may be independently selected from the group consisting of lithium (Li), sodium (Na), potassium (K), rubidium (Rb), cesium (Cs), francium (Fr) and any combination thereof. The alkali metals A' and A'' may be independently selected from the group consisting of $Li^+$, $Na^+$, $K^+$, $Rb^+$, $Cs^+$, $Fr^+$ and any combination thereof. In a preferred embodiment, A' is sodium (Na) and A'' is potassium (K). In a preferred embodiment, A' is $Na^+$ and A'' is $K^+$.

The lanthanide metal Ln may be selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and any combination thereof. The lanthanide metal Ln may be divalent, trivalent or tetravalent. In a preferred embodiment, the lanthanide metal Ln is trivalent. The lanthanide metal Ln may be selected from the group consisting of La(III), Pr(III), Nd(III), Pm(III), Sm(III), Eu(III), Gd(III), Tb(III), Dy(III), Ho(III), Er(III), Tm(III), Yb(III) and any combination thereof. In a preferred embodiment, Ln is La. In a preferred embodiment, La is La(III).

The transition metal M may be selected from any element whose atom has an incomplete d sub-shell, or which may give rise to cations with an incomplete d sub-shell. The transition metal M may be monovalent, divalent, trivalent, tetravalent, pentavalent, hexavalent, heptavalent or octavalent. In a preferred embodiment, the transition metal M is pentavalent. The transition metal M may be selected from the group consisting of vanadium (V), chromium (Cr), manganese (Mn), iron (Fe), cobalt (Co), niobium (Nb), molybdenum (Mo), technetium (Tc), ruthenium (Ru), rhodium (Rh), tantalum (Ta), tungsten (W), rhenium (Re), osmium (Os), iridium (Ir), platinum (Pt), gold (Au) and any combination thereof. The transition metal M may be selected from the group consisting of V(V), Cr(V), Mn(V), Fe(V), Co(V), Nb(V), Mo(V), Tc(V), Ru(V), Rh(V), Ta(V), W(V), Re(V), Os(V), Ir(V), Pt(V), Au(V) and any combination thereof. In a preferred embodiment, M is Nb. In a preferred embodiment, M is Nb(V).

The values for x and y may be in mol %.

The range of x may be selected from $0<x<0.1$, $0<x\leq0.01$, $0<x\leq0.02$, $0<x\leq0.03$, $0<x\leq0.04$, $0<x\leq0.05$, $0<x\leq0.06$, $0<x\leq0.07$, $0<x\leq0.08$, $0<x\leq0.09$, $0.01\leq x\leq0.02$, $0.01\leq x\leq0.03$, $0.01\leq x\leq0.04$, $0.01\leq x\leq0.05$, $0.01\leq x\leq0.06$, $0.01\leq x\leq0.07$, $0.01\leq x\leq0.08$, $0.01\leq x\leq0.09$, $0.01\leq x<0.1$, $0.02\leq x\leq0.03$, $0.02\leq x\leq0.04$, $0.02\leq x\leq0.05$, $0.02\leq x\leq0.06$, $0.02\leq x\leq0.07$, $0.02\leq x\leq0.08$, $0.02\leq x\leq0.09$, $0.02\leq x<0.1$, $0.03\leq x\leq0.04$, $0.03\leq x\leq0.05$, $0.03\leq x\leq0.06$, $0.03\leq x\leq0.07$, $0.03\leq x\leq0.08$, $0.03\leq x\leq0.09$, $0.03\leq x<0.1$, $0.04\leq x\leq0.05$, $0.04\leq x\leq0.06$, $0.04\leq x\leq0.07$, $0.04\leq x\leq0.08$, $0.04\leq x\leq0.09$, $0.04\leq x<0.1$, $0.05\leq x\leq0.06$, $0.05\leq x\leq0.07$, $0.05\leq x\leq0.08$, $0.05\leq x\leq0.09$, $0.05\leq x<0.1$, $0.06\leq x\leq0.07$, $0.06\leq x\leq0.08$, $0.06\leq x\leq0.09$, $0.06\leq x<0.1$, $0.07\leq x\leq0.08$, $0.07\leq x\leq0.09$, $0.07\leq x<0.1$, $0.08\leq x\leq0.09$, $0.08\leq x<0.1$ or $0.09\leq x<0.1$. In a preferred embodiment, $0.04\leq x\leq0.07$.

The range of y may be selected from $0<y<1$, $0<y\leq0.2$, $0<y\leq0.4$, $0<y\leq0.6$, $0<y\leq0.8$, $0.2\leq y\leq0.4$, $0.2\leq y\leq0.6$, $0.2\leq y\leq0.8$, $0.2\leq y<1$, $0.4\leq y\leq0.6$, $0.4\leq y\leq0.8$, $0.4\leq y<1$, $0.6\leq y\leq0.8$, $0.6\leq y<1$ or $0.8\leq y<1$. In a preferred embodiment, $0.4\leq y\leq0.6$. In a preferred embodiment, y=0.5.

The ceramic material may have a perovskite-type $ABO_3$ crystal structure. A perovskite is a calcium titanium oxide mineral species composed of calcium titanate, with the chemical formula $CaTiO_3$. It lends its name to the class of compounds which have the same type of crystal structure as $CaTiO_3$ ($^{XII}A^{2+VI}B^{4+}X^{2-}$) known as the perovskite structure. The general chemical formula for perovskite compounds may be $ABX_3$, where 'A' and 'B' may be two cations of very different sizes, and X is an anion that bonds to both. The 'A' atoms may be larger than the 'B' atoms. The ideal cubic-symmetry structure may have the 'B' cation in 6-fold coordination, surrounded by an octahedron of anions, and the 'A' cation in 12-fold cuboctahedral coordination. The relative ion size requirements for stability of the cubic structure may be quite stringent, so slight buckling and distortion may produce several lower-symmetry distorted versions, in which the coordination numbers of 'A' cations, 'B' cations or both may be reduced. The perovskite structure may be adopted by many oxides that have the chemical formula $ABO_3$.

In the idealized cubic unit cell of such a compound, the type 'A' atom may sit at cube corner positions (0, 0, 0), the type 'B' atom may sit at body centre positions (½, ½, ½) and oxygen atoms may sit at face centered positions (½, ½, 0). Tilting of the $BO_6$ octahedra may reduce the coordination of an undersized 'A' cation from 12 to as low as 8. Conversely, off-centering of an undersized 'B' cation within its octahedron may allow it to attain a stable bonding pattern. The resulting electric dipole may be responsible for the property of ferroelectricity that are shown by perovskite structures such as that of the disclosed ceramic material that may distort in this fashion. Complex perovskite structures may contain two different B-site cations. This may result in the possibility of ordered and disordered variants.

In the disclosed ceramic material, the A sites are occupied by the alkali metals A' and A" and the B sites are occupied by the lanthanide metal Ln and transition metal M.

The ceramic material may be polycrystalline. Polycrystalline materials may be solids that are composed of many crystallites of varying size and orientation. The variation in direction may be random or directed. The variation in direction may be a result of growth and processing conditions. Polycrystalline may be a structure of a solid material that, when cooled, may form crystallite grains at different points within it. The areas where these crystallite grains meet may be known as grain boundaries.

The ceramic material may be transparent. Optical transparency in polycrystalline materials may be limited by the amount of radiation which may be scattered by their microstructural features. Radiation scattering may depend on the wavelength of the radiation. Limits to spatial scales of transmission may therefore arise, depending on the frequency of the wavelength of the radiation and the physical dimension of the scattering center. Primary scattering centers in polycrystalline materials include microstructural defects such as pores and grain boundaries. In addition to pores, most of the interfaces in a typical metal or ceramic object are in the form of grain boundaries which separate tiny regions of crystalline order. When the size of the scattering center (or grain boundary) is reduced below the size of the wavelength of the radiation being scattered, the scattering no longer occurs to any significant extent. Therefore, the observed transparency of the ceramic material may be due to the scattering center or grain boundary being reduced below the size of the wavelength of the radiation being scattered.

The material may have the highest transparency when $x=0.05$, that is for the 5 mol % La-doped KNN ceramic material with the formula $(K_{0.5}Na_{0.5})_{0.95}La_{0.05}Nb_{0.98}O_3$.

The ceramic material, due to its composition and structure, may be ferroelectric. The distinguishing feature of ferroelectricity is that the spontaneous polarization may be reversed by an applied electric field. The polarization may be dependent not only on the current electric field but also on its history, yielding a hysteresis loop. The hysteresis effect may be used as a memory function. Ferroelectric materials, due to symmetry considerations, may also be piezoelectric and pyroelectric. Due to the ferroelectric nature of the material, the ceramic material may also have electro-optic properties.

In one embodiment, the material may have the composition $(Na_{0.5}K_{0.5})_{(1-x)}La_xNb_{(1-2x/5)}O_3$ wherein $0<x<0.1$.

Illustrative, non-limiting embodiments of a method for fabricating a ceramic material in accordance with the second aspect will now be disclosed.

A method for fabricating a ceramic material may comprise the step of contacting alkali metal starting materials, a lanthanide metal starting material, a transition metal starting material and oxygen according to the composition: $(A'_{(1-y)}A''_y)_{1-x}Ln_xN_{(1-2x/5)}O_3$ wherein $0<x<0.1$; $0<y<1$; A' and A" are independently, alkali metals; Ln is a lanthanide metal; and M is a transition metal.

The alkali metal A' and A" may be the same alkali metal or different alkali metals. The alkali metals A' and A" may be independently selected from the group consisting of Li, Na, K, Rb, Cs, Fr and any combination thereof. The alkali metals A' and A" may be independently selected from the group consisting of $Li^+$, $Na^+$, $K^+$, $Rb^+$, $Cs^+$, $Fr^+$ and any combination thereof. In a preferred embodiment, A' is sodium (Na) and A" is potassium (K). In a preferred embodiment, A' is $Na^+$ and A" is $K^+$.

The alkali metal starting materials may be elemental alkali metals or salts of alkali metals. The salts of alkali metals may be oxide, carbonate, oxalate, sulfide, sulphite, sulfate, nitrate, fluoride, chloride, bromide or iodide salts of alkali metals, or any combination thereof. The alkali metal starting materials may be selected from the group consisting of Li, Na, K, Rb, Cs, Fr, $Li_2O$, $Na_2O$, $K_2O$, $Rb_2O$, $Cs_2O$, $Fr_2O$, $Li_2CO_3$, $Na_2CO_3$, $K_2CO_3$, $Rb_2CO_3$, $Cs_2CO_3$, $Fr_2CO_3$, $Li_2C_2O_4$, $Na_2C_2O_4$, $K_2C_2O_4$, $Rb_2C_2O_4$, $Cs_2C_2O_4$, $Fr_2C_2O_4$, $LiHCO_3$, $NaHCO_3$, $KHCO_3$, $RbHCO_3$, $CsHCO_3$, $FrHCO_3$, $Li_2S$, $Na_2S$, $K_2S$, $Rb_2S$, $Cs_2S$, $Fr_2S$, $Li_2SO_3$, $Na_2SO_3$, $K_2SO_3$, $Rb_2SO_3$, $Cs_2SO_3$, $Fr_2SO_3$, $Li_2SO_4$, $Na_2SO_4$, $K_2SO_4$, $Rb_2SO_4$, $Cs_2SO_4$, $Fr_2SO_4$, $LiNO_3$, $NaNO_3$, $KNO_3$, $RbNO_3$, $CsNO_3$, $FrNO_3$, LiF, NaF, KF, RbF, CsF, FrF, LiCl, NaCl, KCl, RbCl, CsCl, FrCl, LiBr, NaBr, KBr, RbBr, CsBr, FrBr, LiI, NaI, KI, RbI, CsI, FrI and any combination thereof. One or two different alkali metal starting materials may be selected for fabrication of the ceramic material.

The lanthanide metal Ln may be selected from the group consisting of La, Ce, Pr, Nd, Pm, Sm, Eu, Gd, Tb, Dy, Ho, Er, Tm, Yb and any combination thereof. The lanthanide metal Ln may be divalent, trivalent or tetravalent. In a preferred embodiment, the lanthanide metal Ln is trivalent. The lanthanide metal Ln may be selected from the group consisting of La(III), Ce(III), Pr(III), Nd(III), Pm(III), Sm(III), Eu(III), Gd(III), Tb(III), Dy(III), Ho(III), Er(III), Tm(III), Yb(III) and any combination thereof. In a preferred embodiment, Ln is La. In a preferred embodiment, La is La(III).

The lanthanide metal starting material may be elemental lanthanide metals or salts of lanthanide metals. The salts of lanthanide metals may be oxide, ethoxide, isopropoxide, acetate, nitrate, sulfate, chloride, bromide or iodide salts of lanthanides. The lanthanide metal starting material may be selected from the group consisting of La, Ce, Pr, Nd, Pm, Sm, Eu, Gd, Tb, Dy, Ho, Er, Tm, Yb, $La_2O_3$, $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La(OC_2H_5)_3$, $Ce(OC_2H_5)_3$, $Pr(OC_2H_5)_3$, $Nd(OC_2H_5)_3$, $Pm(OC_2H_5)_3$, $Sm(OC_2H_5)_3$, $Eu(OC_2H_5)_3$, $Gd(OC_2H_5)_3$, $Tb(OC_2H_5)_3$, $Dy(OC_2H_5)_3$, $Ho(OC_2H_5)_3$, $Er(OC_2H_5)_3$, $Tm(OC_2H_5)_3$, $Yb(OC_2H_5)_3$, $La(OCH(CH_3)_2)_3$, $Ce(OCH(CH_3)_2)_3$, $Pr(OCH(CH_3)_2)_3$, $Nd(OCH(CH_3)_2)_3$, $Pm(OCH(CH_3)_2)_3$, $Sm(OCH(CH_3)_2)_3$, $Eu(OCH(CH_3)_2)_3$, $Gd(OCH(CH_3)_2)_3$, $Tb(OCH(CH_3)_2)_3$, $Dy(OCH(CH_3)_2)_3$, $Ho(OCH(CH_3)_2)_3$, $Er(OCH(CH_3)_2)_3$, $Tm(OCH(CH_3)_2)_3$, $Yb(OCH(CH_3)_2)_3$, $La(CH_3CO_2)_3$, $Ce(CH_3CO_2)_3$, $Pr(CH_3CO_2)_3$, $Nd(CH_3CO_2)_3$, $Pm(CH_3CO_2)_3$, $Sm(CH_3CO_2)_3$, $Eu(CH_3CO_2)_3$, $Gd(CH_3CO_2)_3$, $Tb(CH_3CO_2)_3$, $Dy(CH_3CO_2)_3$, $Ho(CH_3CO_2)_3$, $Er(CH_3CO_2)_3$, $Tm(CH_3CO_2)_3$, $Yb(CH_3CO_2)_3$, $La(NO_3)_3$, $Ce(NO_3)_3$, $Pr(NO_3)_3$, $Nd(NO_3)_3$, $Pm(NO_3)_3$, $Sm(NO_3)_3$, $Eu(NO_3)_3$, $Gd(NO_3)_3$, $Tb(NO_3)_3$, $Dy(NO_3)_3$, $Ho(NO_3)_3$, $Er(NO_3)_3$, $Tm(NO_3)_3$, $Yb(NO_3)_3$, $La_2(SO_4)_3$, $Ce_2(SO_4)_3$, $Pr_2(SO_4)_3$, $Nd_2(SO_4)_3$, $Pm_2(SO_4)_3$, $Sm_2(SO_4)_3$, $Eu_2(SO_4)_3$, $Gd_2(SO_4)_3$, $Tb_2(SO_4)_3$, $Dy_2(SO_4)_3$, $Ho_2(SO_4)_3$, $Er_2(SO_4)_3$, $Tm_2(SO_4)_3$, $Yb_2(SO_4)_3$, $LaCl_3$, $CeCl_3$, $PrCl_3$, $NdCl_3$, $PmCl_3$, $SmCl_3$, $EuCl_3$, $GdCl_3$, $TbCl_3$, $DyCl_3$, $HoCl_3$, $ErCl_3$, $TmCl_3$, $YbCl_3$, $LaBr_3$, $CeBr_3$, $PrBr_3$, $NdBr_3$, $PmBr_3$, $SmBr_3$, $EuBr_3$, $GdBr_3$, $TbBr_3$, $DyBr_3$, $HoBr_3$, $ErBr_3$, $TmBr_3$, $YbBr_3$, $LaI_3$, $CeI_3$, $PrI_3$, $NdI_3$, $PmI_3$, $SmI_3$, $EuI_3$, $GdI_3$, $TbI_3$, $DyI_3$, $HoI_3$, $ErI_3$, $TmI_3$, $YbI_3$, and any combination thereof.

The transition metal M may be selected from any element whose atom has an incomplete d sub-shell, or which may give rise to cations with an incomplete d sub-shell. The transition metal M may be monovalent, divalent, trivalent, tetravalent, pentavalent, hexavalent, heptavalent or octavalent. In a preferred embodiment, the transition metal M is pentavalent. The transition metal M may be selected from the group consisting of V, Cr, Mn, Fe, Co, Nb, Mo, Tc, Ru, Rh, Ta, W, Re, Os, Ir, Pt, Au and any combination thereof. The transition metal M may be selected from the group consisting of V(V), Cr(V), Mn(V), Fe(V), Co(V), Nb(V), Mo(V), Tc(V), Ru(V), Rh(V), Ta(V), W(V), Re(V), Os(V), Ir(V), Pt(V), Au(V) and any combination thereof. In a preferred embodiment, M is Nb. In a preferred embodiment, M is Nb(V).

The transition metal starting material may be elemental transition metals or salts of transition metals. The salts of transition metals may be oxide, ethoxide, isopropoxide, acetate, nitrate, sulphate, chloride, bromide or iodide salts of transition metals. The salts of transition metals may be pentavalent oxide salts of transition metals. The lanthanide metal starting material may be selected from the group consisting of V, Cr, Mn, Fe, Co, Nb, Mo, Tc, Ru, Rh, Ta, W, Re, Os, Ir, Pt, Au, $V_2O_5$, $Cr_2O_5$, $Mn_2O_5$, $Fe_2O_5$, $Co_2O_5$, $Nb_2O_5$, $Mo_2O_5$, $Tc_2O_5$, $Ru_2O_5$, $Rh_2O_5$, $Ta_2O_5$, $W_2O_5$, $Re_2O_5$, $Os_2O_5$, $Ir_2O_5$, $Pt_2O_5$, $Au_2O_5$, $V(OC_2H_5)_5$, $Cr(OC_2H_5)_5$, $Mn(OC_2H_5)_5$, $Fe(OC_2H_5)_5$, $Co(OC_2H_5)_5$, $Nb(OC_2H_5)_5$, $Mo(OC_2H_5)_5$, $Tc(OC_2H_5)_5$, $Ru(OC_2H_5)_5$, $Rh(OC_2H_5)_5$, $Ta(OC_2H_5)_5$, $W(OC_2H_5)_5$, $Re(OC_2H_5)_5$, $Os(OC_2H_5)_5$, $In(OC_2H_5)_5$, $Pt(OC_2H_5)_5$, $Au(OC_2H_5)_5$, $V(OCH(CH_3)_2)_5$, $Cr(OCH(CH_3)_2)_5$, $Mn(OCH(CH_3)_2)_5$, $Fe(OCH(CH_3)_2)_5$, $Co(OCH(CH_3)_2)_5$, $Nb(OCH(CH_3)_2)_5$, $Mo(OCH(CH_3)_2)_5$, $Tc(OCH(CH_3)_2)_5$, $Ru(OCH(CH_3)_2)_5$, $Rh(OCH(CH_3)_2)_5$, $Ta(OCH(CH_3)_2)_5$, $W(OCH(CH_3)_2)_5$, $Re(OCH(CH_3)_2)_5$, $Os(OCH(CH_3)_2)_5$, $Ir(OCH(CH_3)_2)_5$, $Pt(OCH(CH_3)_2)_5$, $Au(OCH(CH_3)_2)_5$, $V(CH_3CO_2)_5$, $Cr(CH_3CO_2)_5$, $Mn(CH_3CO_2)_5$, $Fe(CH_3CO_2)_5$, $Co(CH_3CO_2)_5$, $Nb(CH_3CO_2)_5$, $Mo(CH_3CO_2)_5$, $Tc(CH_3CO_2)_5$, $Ru(CH_3CO_2)_5$, $Rh(CH_3CO_2)_5$, $Ta(CH_3CO_2)_5$, $W(CH_3CO_2)_5$, $Re(CH_3CO_2)_5$, $Os(CH_3CO_2)_5$, $Ir(CH_3CO_2)_5$, $Pt(CH_3CO_2)_5$, $Au(CH_3CO_2)_5$, $V(NO_3)_5$, $Cr(NO_3)_5$, $Mn(NO_3)_5$, $Fe(NO_3)_5$, $Co(NO_3)_5$, $Nb(NO_3)_5$, $Mo(NO_3)_5$, $Tc(NO_3)_5$, $Ru(NO_3)_5$, $Rh(NO_3)_5$, $Ta(NO_3)_5$, $W(NO_3)_5$, $Re(NO_3)_5$, $Os(NO_3)_5$, $Ir(NO_3)_5$, $Pt(NO_3)_5$, $Au(NO_3)_5$, $V_2(SO_4)_5$, $Cr_2(SO_4)_5$, $Mn_2(SO_4)_5$, $Fe_2(SO_4)_5$, $Co_2(SO_4)_5$, $Nb_2(SO_4)_5$, $Mo_2(SO_4)_5$, $Tc_2(SO_4)_5$, $Ru_2(SO_4)_5$, $Rh_2(SO_4)_5$, $Ta_2(SO_4)_5$, $W_2(SO_4)_5$, $Re_2(SO_4)_5$, $Os_2(SO_4)_5$, $Ir_2(SO_4)_5$, $Pt_2(SO_4)_5$, $Au_2(SO_4)_5$, $VCl_5$, $CrCl_5$, $MnCl_5$, $FeCl_5$, $CoCl_5$, $NbCl_5$, $MoCl_5$, $TcCl_5$, $RuCl_5$, $RhCl_5$, $TaCl_5$, $WCl_5$, $ReCl_5$, $OsCl_5$, $IrCl_5$, $PtCl_5$, $AuCl_5$, $VBr_5$, $CrBr_5$, $MnBr_5$, $FeBr_5$, $CoBr_5$, $NbBr_5$, $MoBr_5$, $TcBr_5$, $RuBr_5$, $RhBr_5$, $TaBr_5$, $WBr_5$, $ReBr_5$, $OsBr_5$, $IrBr_5$, $PtBr_5$, $AuBr_5$, $VI_5$, $CrI_5$, $MnI_5$, $FeI_5$, $CoI_5$, $NbI_5$, $MoI_5$, $TcI_5$, $RuI_5$, $RhI_5$, $TaI_5$, $WI_5$, $ReI_5$, $OsI_5$, $IrI_5$, $PtI_5$, $AuI_5$ and any combination thereof.

The oxygen may be in the form of a gas or an oxide of a metal.

The range of x may be selected from $0<x<0.1$, $0<x\leq0.01$, $0<x\leq0.02$, $0<x\leq0.03$, $0<x\leq0.04$, $0<x\leq0.05$, $0<x\leq0.06$, $0<x\leq0.07$, $0<x\leq0.08$, $0<x\leq0.09$, $0.01\leq x\leq0.02$, $0.01\leq x\leq0.03$, $0.01\leq x\leq0.04$, $0.01\leq x\leq0.05$, $0.01\leq x\leq0.06$, $0.01\leq x\leq0.07$, $0.01\leq x\leq0.08$, $0.01\leq x\leq0.09$, $0.01\leq x<0.1$, $0.02\leq x\leq0.03$, $0.02\leq x\leq0.04$, $0.02\leq x\leq0.05$, $0.02\leq x\leq0.06$, $0.02\leq x\leq0.07$, $0.02\leq x\leq0.08$, $0.02\leq x\leq0.09$, $0.02\leq x<0.1$, $0.03\leq x\leq0.04$, $0.03\leq x\leq0.05$, $0.03\leq x\leq0.06$, $0.03\leq x\leq0.07$, $0.03\leq x\leq0.08$, $0.03\leq x\leq0.09$, $0.03\leq x<0.1$, $0.04\leq x\leq0.05$, $0.04\leq x\leq0.06$, $0.04\leq x\leq0.07$, $0.04\leq x\leq0.08$, $0.04\leq x\leq0.09$, $0.04\leq x<0.1$, $0.05\leq x\leq0.06$, $0.05\leq x\leq0.07$, $0.05\leq x\leq0.08$, $0.05\leq x\leq0.09$, $0.05\leq x<0.1$, $0.06\leq x\leq0.07$, $0.06\leq x\leq0.08$, $0.06\leq x\leq0.09$, $0.06\leq x<0.1$, $0.07\leq x\leq0.08$, $0.07\leq x\leq0.09$, $0.07\leq x<0.1$, $0.08\leq x\leq0.09$, $0.08\leq x<0.1$ or $0.09\leq x<0.1$. In a preferred embodiment, $0.04\leq x\leq0.07$.

The range of y may be selected from $0<y<1$, $0<y\leq0.2$, $0<y\leq0.4$, $0<y\leq0.6$, $0<y\leq0.8$, $0.2\leq y\leq0.4$, $0.2\leq y\leq0.6$, $0.2\leq y\leq0.8$, $0.2\leq y\leq1$, $0.4\leq y\leq0.6$, $0.4\leq y\leq0.8$, $0.4\leq y<1$, $0.6\leq y\leq0.8$, $0.6\leq y<1$ or $0.8\leq y<1$. In a preferred embodiment, $0.4\leq y\leq0.6$. In a preferred embodiment, y=0.5.

The values for x and y may be in mol %.

The alkali metal starting materials, the lanthanide metal starting material, the transition metal starting material and the oxygen may be contacted in the form of a powder. The step of contacting the starting materials may comprise weighing out the starting material powders according to the formula $(A'_{(1-y)}A''_y)_{1-x}Ln_xM_{(1-2x/5)}O_3$ wherein $0<x<0.1$; $0<y<1$; A' and A" are independently, alkali metals; Ln is a lanthanide metal; and M is a transition metal. The step of contacting may further comprise physical mixing of the appropriately weighed starting material powders. It is to be noted that any other contacting methods known to the skilled person may be used as long as it fulfils the function of contacting the starting materials together in the appropriate proportions.

In one embodiment, the method for fabricating a ceramic material may comprise the step of contacting the alkali metal starting materials, a lanthanide metal starting material, a transition metal starting material and oxygen according to the composition: $(Na_{0.5}K_{0.5})_{(1-x)}La_xNb_{(1-2x/5)}O_3$ wherein $0<x<0.1$.

The method for fabricating the ceramic material may further comprise a step of forming a solid solution. A solid solution may be formed by taking the mixture of contacted powders of alkali metal starting materials, a lanthanide metal starting material, a transition metal starting material and oxygen and mechanically milling the mixture. The method of forming a solid solution may further comprise wet chemistry methods. The wet chemistry methods may comprise sol-gel processes, the Pechini method or co-precipitation processes. The milling may grind the powders into a very fine powder. The milling may result in the formation of a solid solution, as the starting materials may become single phase. The solute may be incorporated into the solvent crystal lattice substitutionally, by replacing a solvent particle in the lattice, or interstitially, by fitting into the space between solvent particles. By milling for a long period of time such as 48 to 96 hours, the starting precursors may undergo localised solid state reactions.

The mechanical milling may be performed using a ball mill. The ball mill may comprise zirconia balls, silicon carbide balls, silicon nitride balls, aluminium oxide balls or any mixture thereof may be used as the milling medium. The diameter of the balls may be in the range of 2 mm to 15 mm. A mixture of balls with different diameters in the range of 2 mm to 15 mm may be used as the milling medium. The mechanical milling may be performed dry or in the presence of a liquid medium. The liquid medium may be water, alcohol or acetone. The alcohol may be methanol, ethanol or propanol. The milling may be performed for a duration of 1 hour to 72 hours. The milling may be performed at room temperature or at elevated temperatures. The milling may be performed at atmospheric pressures or elevated pressures. The milling may be performed at high or low speeds in the range of 50 to 400 rpm.

It is to be noted that any other methods for forming a solid solution known to the skilled person may be used as long as it fulfils the function of forming the ceramic solid solution.

The method for fabricating the ceramic material may further comprise a step of calcining the solid solution. Calcining may be a thermal treatment process for materials carried out in the presence of air or oxygen to bring about a thermal decomposition, phase transition, or removal of a volatile fraction. The calcination process may cause the solid solution to adopt a perovskite-type $ABO_3$ crystal structure. The calcination process may take place at temperatures below the melting point of the product materials or above the thermal decomposition temperature or the transition temperature. This temperature may be defined as the temperature at which the standard Gibbs free energy for a particular calcination reaction is equal to zero.

The calcining step may be carried out in a furnace or a reactor. The solid solution may be dried prior to calcining. The drying may be performed at room temperature or elevated temperatures in a conventional or vacuum oven. The calcination may be performed in the temperature range of about 750° C. to about 900° C., about 750° C. to about 800° C., about 750° C. to about 850° C., about 800° C. to about 850° C., about 800° C. to about 900° C. or about 850° C. to about 900° C. The calcination may be performed for a duration of about 1.5 hours to about 10 hours, about 1.5 hours to about 2 hours, about 1.5 hours to about 3 hours, about 1.5 hours to about 4 hours, about 1.5 hours to about 5 hours, about 1.5 hours to 6 hours, about 1.5 hours to about 7 hours, about 1.5 hours to about 8 hours, about 1.5 hours to about 9 hours, about 2 hours to about 3 hours, about 2 hours to about 4 hours, about 2 hours to about 5 hours, about 2 hours to about 6 hours, about 2 hours to about 7 hours, about 2 hours to about 8 hours, about 2 hours to about 9 hours, about 2 hours to about 10 hours, about 3 hours to about 4 hours, about 2 hours to about 5 hours, about 3 hours to about 6 hours, about 3 hours to about 7 hours, about 3 hours to about 8 hours, about 3 hours to about 9 hours, about 3 hours to about 10 hours, about 4 hours to about 5 hours, about 4 hours to about 6 hours, about 4 hours to about 7 hours, about 4 hours to about 8 hours, about 4 hours to about 9 hours, about 4 hours to about 10 hours, about 5 hours to about 6 hours, about 5 hours to about 7 hours, about 5 hours to about 8 hours, about 5 hours to about 9 hours, about 5 hours to about 10 hours, about 6 hours to about 7 hours, about 6 hours to about 8 hours, about 6 hours to about 9 hours, about 6 hours to about 10 hours, about 7 hours to about 8 hours, about 7 hours to about 9 hours, about 7 hours to about 10 hours, about 8 hours to about 9 hours, about 8 hours to about 10 hours or about 9 hours to about 10 hours. The calcination may be performed at atmospheric pressures.

It is to be noted that any other methods for calcining known to the skilled person may be used as long as it fulfills the function of calcining the ceramic solid solution.

The method for fabricating the ceramic material may further comprise a step of compacting the solid solution. Powder compaction may be a process of compacting a powder in a die through the application of high pressures. The compacting of the solid solution may comprise mechanical compaction. Mechanical compaction may comprise application of a uniaxial pressure. The density of the compacted powder may be directly proportional to the amount of pressure applied. The compaction step may determine the final shape of the ceramic material. The final shape of the ceramic material may be a disc.

The compacting step may be performed in a compactor. Mechanical compaction may be performed dry or in the presence of a liquid medium: The liquid medium may be a binder. The binder may comprise polyvinylalcohol (PVA), polyvinyl butyral (PVB) or any combination thereof. The compacting may be performed using cold or hot isostatic press method. The compacting step may be performed at room temperature or at elevated temperatures. The compacting step may be performed by applying a force to the calcined solid solution in the range from about 1 MPa to about 800 MPa, about 1 MPa to about 100 MPa, about 1 MPa to about 200 MPa, about 1 MPa to about 300 MPa, about 1 MPa to about 400 MPa, about 1 MPa to about 500 MPa, about 1 MPa to about 600 MPa, about 1 MPa to about 700 MPa, about 100 MPa to about 200 MPa, about 100 MPa to about 300 MPa, about 100 MPa to about 400 MPa, about 100 MPa to about 500 MPa, about 100 MPa to about 600 MPa, about 100 MPa to about 700 Mpa, about 100 MPa to about 800 Mpa, about 200 MPa to about 300 MPa, about 200 MPa to about 400 MPa, about 200 MPa to about 500 MPa, about 200 MPa to about 600 MPa, about 200 MPa to about 700 MPa, about 200 MPa to about 800 Mpa, about 300 MPa to about 400 MPa, about 300 MPa to about 500 MPa, about 300 MPa to about 600 MPa, about 300 Mpa to about 700 Mpa, about 300 MPa to about 800 MPa, about 400 MPa to about 500 MPa, about 400 MPa to about 600 MPa, about 400 MPa to about 700 MPa, about 400 MPa to about 800 Mpa, about 500 MPa to about 600 MPa, about 500 MPa to about 700 MPa, about 500 MPa to about 800 MPa, about 600 MPa to about 700 MPa, about 600 MPa to about 800 Mpa or about 700 MPa to about 800 MPa. The resulting compacted solid, before sintering, may be referred to as the 'green body'.

It is to be noted that any other methods for compacting known to the skilled person may be used as long as it fulfills the function of compacting the ceramic solid solution.

The method for fabricating the ceramic material may further comprise a step of sintering the solid solution. The process of sintering may be based on atomic diffusion. Diffusion may occur in any material above absolute zero, but it may occur much faster at higher temperatures. In most sintering processes, the powdered material may be held in a mould and then heated to a temperature below the melting point. The atoms in the powder particles may diffuse across the boundaries of the particles, fusing the particles together and creating one solid piece.

Prior to sintering, the green body may be heated at low temperatures to burn off any binders that may have been used during compacting. The sintering may be performed in a conventional furnace or a furnace with a controlled atmosphere. A furnace with a controlled atmosphere may have an atmosphere of air, nitrogen, argon or any combination thereof. Sintering may be performed by spark plasma sintering, microwave sintering, laser sintering or by using a UV-assisted rapid thermal annealing system. Sintering may be performed in the temperature range of about 1000° C. to about 1350° C., about 1000° C. to about 1050° C., about 1000° C. to about 1100° C., about 1000° C. to about 1150° C., about 1000° C. to about 1200° C., about 1000° C. to about 1250° C., about 1000° C. to about 1300° C., about 1050° C. to about 1100° C., about 1050° C. to about 1150° C., about 1050° C. to about 1200° C., about 1050° C. to about 1250° C., about 1050° C. to about 1300° C., about 1050° C. to about 1350° C., about 1100° C. to about 1150° C., about 1100° C. to about 1200° C., about 1100° C. to about 1250° C., about 1100° C. to about 1300° C., about 1100° C. to about 1350° C., about 1150° C. to about 1200° C., about 1150° C. to about 1250° C., about 1150° C. to about 1300° C., about 1150° C. to about 1350° C., about 1200° C. to about 1250° C., about 1200° C. to about 1300° C., about 1200° C. to about 1350° C., about 1250° C. to about 1300° C., about 1250° C. to about 1350° C. or about 1300° C. to about 1350° C. The sintering may be performed for a duration of about 2 hours to about 12 hours, about 2 hours to about 4 hours, about 2 hours to about 6 hours, about 2 hours to about 8 hours, about 2 hours to about 10 hours, about 4 hours to about 6 hours, about 4 hours to about 8 hours, about 4 hours to about 10 hours, about 4 hours to about 10 hours, about 4 hours to about 12 hours, about 6 hours to about 8 hours, about 6 hours to about 10 hours, about 6 hours to about 12 hours, about 8 hours to about 10 hours, about 8 hours to about 12 hours or about 10 to about 12 hours. The sintering may be performed at atmospheric pressures or at elevated pressures.

It is to be noted that any other methods for sintering known to the skilled person may be used as long as it fulfils the function of sintering the ceramic solid solution.

The La-doping may cause an improvement in densification of the transparent ceramic material. The La-doping may result in the rearrangement of the ceramic material such that the pores become filled. The La-doping may result in actually causing the pores to shrink. Sintering may occur by the diffusion of atoms or molecules through the microstructure. This diffusion may occur due to the existence of a chemical potential gradient, allowing atoms or molecules to move from an area of higher chemical potential to an area of lower chemical potential. La-doping may increase charge at the A site while decreasing charge at the B site. This may increase the chemical potential, causing a more efficient diffusion of the atoms and molecules through the microstructure.

Further, La-doping may affect the densification process by altering the temperature at which sintering occurs. La has a stable valency state, which may help the overall stoichiometry of the components of the ceramic material to remain intact at elevated temperatures. In the La-doped KNN ceramic material, sintering may be controlled through liquid-phase materials. This may involve a finely ground solid phase with an appropriate diameter and a liquid phase with an appropriate concentration to obtain the correct capillary pressure. If the correct conditions are not met, the densification process may cease, and the material will not be transparent. The rate of transformation of transparent ceramics during sintering may depend upon the pore size, viscosity and amount of liquid phase present and surface tension. Densification may be temperature-dependent because at higher temperatures, viscosity may decrease and liquid content may increase. The change in composition of the ceramic material by La-doping may significantly affect the entire transformation process. The presence of La may help to maintain the stoichiometry of the components in the ceramic material during sintering, allowing the final sintered ceramic to be transparent.

The performance of a ceramic component may critically depend on the manufacturing process. In particular, initial powder characteristics and processing, including cold forming and sintering, may have a strong impact on the mechanical properties of the components as they may generate a defect population of microcracks, density gradients, pores and agglomerates within the green body and sintered compounds. In particular, the mechanical characteristics of the green body may strongly affect the subsequent sintering process and thus the mechanical properties of the final piece.

The method for fabrication of the ceramic material is well suited for mass production of the material due to its simplicity, cost effectiveness, and eco-friendliness.

Illustrative, non-limiting embodiments of a ceramic material in accordance with the third aspect will now be disclosed.

A ceramic material may be fabricated according to the methods of the second aspect. The ceramic material may be fabricated by a method comprising the step of contacting alkali metal starting materials, a lanthanide metal starting material, a transition metal starting material and oxygen according to the composition: $(A'_{(1-y)}A''_y)_{1-x}Ln_xM_{(1-2x/5)}O_3$ wherein $0<x<0.1$; $0<y<1$; A' and A'' are independently, alkali metals; Ln is a lanthanide metal; and M is a transition metal. The method may further comprise the steps of forming a solid solution, calcining, compacting and sintering of the solid solution.

Illustrative, non-limiting embodiments of an electro-optical device in accordance with the fourth aspect will now be disclosed.

An electro-optical device may comprise the ceramic material as disclosed in the first or third aspects or may be fabricated according to the second aspect.

The device may comprise the ceramic material having the composition: $(A'_{(1-y)}A''_y)_{(1-x)}Ln_xM_{(1-2x/5)}O_3$ wherein $0<x<0.1$; $0<y<1$; A' and A'' are independently, alkali metals; Ln is a lanthanide metal; and M is a transition metal and two electrodes on either side. The electrodes may be an anode and a cathode. The electrodes may comprise a conducting material. The conducting material may be opaque or transparent. The conducting material may comprise metals, metal oxides, carbon-based materials or organic polymers. The conducting material may comprise silver, graphene, indium zinc oxide, aluminium zinc oxide, gallium zinc oxide, lanthanum strontium manganite (LSM or LSMO), $SnO_2$:F or indium tin oxide (ITO). The electrodes may comprise a transparent substrate with a patterned transparent conducting material. The electrodes may comprise a transparent substrate with patterned ITO. ITO may be a heavily-doped n-type semiconductor with a large bandgap of around 4 eV. Because of the bandgap, it may be mostly transparent in the visible part of the spectrum.

It is to be noted that any other conducting material known to the skilled person may be used as long as it fulfills the function of being electrodes for the material.

The electro-optic properties of the device may be tuned by applying an external electric field to the ceramic material. The electro-optic effect relates to a change in the optical properties of the medium which usually is a change in the birefringence and not simply the refractive index. In a Pockels cell, the change in birefringence may vary linearly with the electric field, and the material is a crystal. Electro-optic devices are devices in which a signal-controlled element exhibiting the electro-optic effect is used to modulate a beam of light or radiation. The modulation may be imposed on the phase, frequency, amplitude, or polarization of the beam. The electro-optic effect may be the change in the optical properties of a material resulting from the application of a DC or low-frequency electric field. This may be caused by forces that distort the position, orientation, or shape of the unit cell and additional geometrical bonding arrangements of the molecules constituting the material.

The transparency of the device may be modulated by application of an external electric field. The radiation transmission properties of the device may be modulated by application of an electric field. The device may absorb all radiation in the UV-Vis region in the presence or absence of an externally applied electric field. The UV-Vis region may be wavelengths shorter than about 750 nm. The device may absorb all radiation in the far IR region in the presence or absence of an externally applied electric field. The far IR region may be wavelengths longer than about 2750 nm. The device may be transparent at wavelengths in the range of about 750 nm to about 2800 nm, about 750 nm to about 1250 nm, about 750 nm to about 1750 nm, about 750 nm to about 2250 nm, about 1250 nm to about 1750 nm, about 1250 nm to about 2250 nm, about 1750 nm to about 2250 nm, about 1750 nm to about 2800 nm or about 2250 nm to about 2800 nm. The transparency of the device between about 750 nm and about 2800 nm may be modulated when an external electric field is applied. The transparency of the device between about 750 nm and about 2800 nm may be increased when an external electric field is applied. The radiation transmission characteristics of the device between 750 nm and 2800 nm may be modulated when an external electric field is applied.

The externally applied electric field may be in the range of about −25 kV/cm to about +25 kV/cm, about −25 kV/cm to about −20 kV/cm, about −25 kV/cm to about −15 kV/cm, about −25 kV/cm to about −10 kv/cm, about −25 kv/cm to about −5 kV/cm, about −25 kV/cm to about +5 kV/cm, about −25 kV/cm to about +10 kV/cm, about −25 kV to about +15 kV/cm, about −25 kV/cm to about +20 kV/cm, about −20 kV/cm to about −15 kV/cm, about −20 kV/cm to about −10 kv/cm, about −20 kv/cm to about −5 kV/cm, about −20 kV/cm to about +5 kV/cm, about −20 kV/cm to about +10 kV/cm, about −20 kV to about +15 kV/cm, about −20 kV/cm to about +20 kV/cm, about −20 kV to about +25 kV/cm, about −15 kV/cm to about −10 kv/cm, about −15 kv/cm to about −5 kV/cm, about −15 kV/cm to about +5 kV/cm, about −15 kV/cm to about +10 kV/cm, about −15 kV to about +15 kV/cm, about −15 kV/cm to about +20 kV/cm, about −15 kV to about +25 kV/cm, about −10 kv/cm, to about −5 kV/cm, about −10 kV/cm to about +5 kV/cm, about −10 kV/cm to about +10 kV/cm, about −10 kV to about +15 kV/cm, about −10 kV/cm to about +20 kV/cm, about −10 kV to about +25 kV/cm, about −5 kV/cm to about +5 kV/cm, about −5 kV/cm to about +10 kV/cm, about −5 kV to about +15 kV/cm, about −5 kV/cm to about +20 kV/cm, about −5 kV to about +25 kV/cm, about +5 kV/cm to about +10 kV/cm, about +5 kV to about +15 kV/cm, about +5 kV/cm to about +20 kV/cm, about +5 kV to about +25 kV/cm, +10 kV to about +15 kV/cm, about +10 kV/cm to about +20 kV/cm, about +10 kV to about +25 kV/cm, +15 kV/cm to about +20 kV/cm, about +15 kV to about +25 kV/cm or about +20 kV to about +25 kV/cm.

The device may be operable at room-temperature. The device may be operable at a temperature range of, about 10° C. to about 40° C., about 10° C. to about 20° C., about 10° C. to about 30° C., about 20° C. to about 30° C., about 20° C. to about 40° C. or about 30° C. to about 40° C.

Due to its electro-optical properties, the transparency of the disclosed ceramic material may be electrically 'shut-off' when the application of the external electric field is removed. The electro-optical device may therefore act as an electrical switch.

Illustrative, non-limiting embodiments of the methods for fabricating an electro-optical device in accordance with the fifth aspect will now be disclosed.

A method for fabricating an electro-optical device comprising the ceramic material as disclosed in the first or third aspects or fabricated according to the second aspect, by providing electrodes to the ceramic material to form an electrical coupling, is discussed.

The method for fabricating the electro-optical device comprising the ceramic material may comprise the direct deposition of the electrodes onto the ceramic material. The deposition may be carried out by thin film deposition of the electrodes. This thin film deposition method may comprise thermal evaporation or solution processes. The thin film deposition may comprise thermal evaporation, spin coating, spray coating, dip coating, screen printing, inkjet printing, blade coating, magnetron-sputtering, atomic layer deposition (ALD) or any of their combination thereof. The electrode may be designed by standard lithographic top-down or bottom-up approach or by electron beam lithography. It is to be noted that any other deposition methods known to the skilled person may be used as long as it fulfills the function of depositing the electrode on the transparent ceramic material.

The formation of the electrical coupling will enable an external electric field to be applied to the device such that electro-optic properties of the ceramic material may be observed.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and, not as a definition of the limits of the invention.

DETAILED DESCRIPTION OF DRAWINGS

Figure 1:
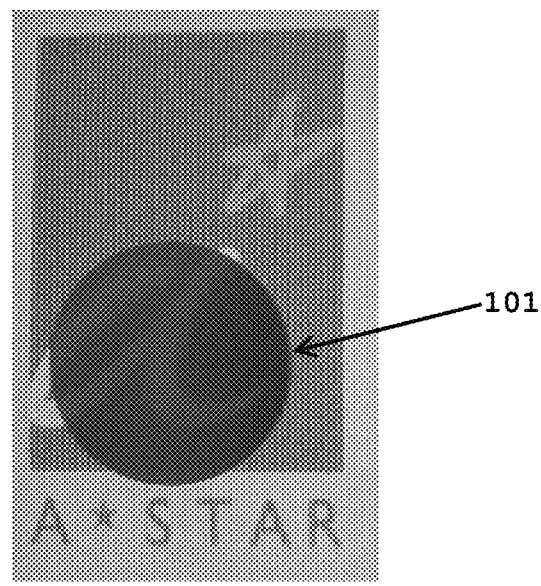
FIG. 1 is an optical photograph taken with a disc of the $(K_{0.5}Na_{0.5})_{0.95}La_{0.05}Nb_{0.98}O_3$ (5 mol % La-doped KNN) ceramic material overlayed on top of a representative picture.

FIG. 1 is an optical photograph taken with a disc of the $(K_{0.5}Na_{0.5})_{0.95}La_{0.05}Nb_{0.98}O_3$ (5 mol % La-doped KNN) ceramic material (101) overlayed on top of a representative picture. This photograph shows that the 5 mol % La-doped KNN ceramic material is transparent, as it transmits light in order for the object behind it to be distinctly seen. The density of this ceramic material was measured to be 99 percent of the theoretical density. The transparency remained unaffected by extreme environments such as high or low temperatures and high or low pressures.

EXAMPLES

Non-limiting examples of the invention will be further described in greater detail by reference to specific Examples, which should not be construed as in any way limiting the scope of the invention.

Example 1: Fabrication of the Electro-Optical Devices

The $(K_{0.5}Na_{0.5})_{0.95}La_{0.05}Nb_{0.98}O_3$ (5 mol % La-doped KNN) ceramic material was prepared by conventional solid state ceramic preparation techniques. The 5 mol % La-doped KNN ceramic material was prepared by the mixed-oxide method. The starting materials $K_2CO_3$, $Na_2CO_3$, $La_2O_3$ and $Nb_2O_5$ were weighed according to the chemical formula. The compounds were mixed and planetary milled for 4 hours at 300 rpm using ethanol as solvent and a mixture of 5 mm and 10 mm diameter zirconia balls The powder weight to ball media ratio was kept at 1:3. as the milling media to form the $(K_{0.5}Na_{0.5})_{0.95}La_{0.05}Nb_{0.98}O_3$ solid solution powder. The solid solution powder was then calcined at 800° C. to 850° C. for 4 hours to 6 hours in air to decompose the carbonates and form the perovskite structure. The milling step was repeated to homogenise the powder and also to reduce the average particle size. The powder was dried in an oven at 120° C. for 2 hours then put inside a custom made high carbon steel die punch and uniaxially pressed for 2 min at 500 MPa to obtain pellets with approximately 10.0 mm diameter and 1.3 mm thickness. The removal of the binder was carried out at 500° C. for 1 hour at a ramp rate of 2° C. per minute from room temperature. Sintering was carried out at 1170° C. for 3 hours to 10 hours in air at a ramp rate of 2° C. to 5° C. per minute. The temperature was then ramped down at a ramp rate of 3° C. per minute. The formed 5 mol % La-doped KNN ceramic material had a high density; that is, a density of about 99 percent of the theoretical density.

Example 2: Crystal Structure of the Electro-Optical Devices

Figure 2:
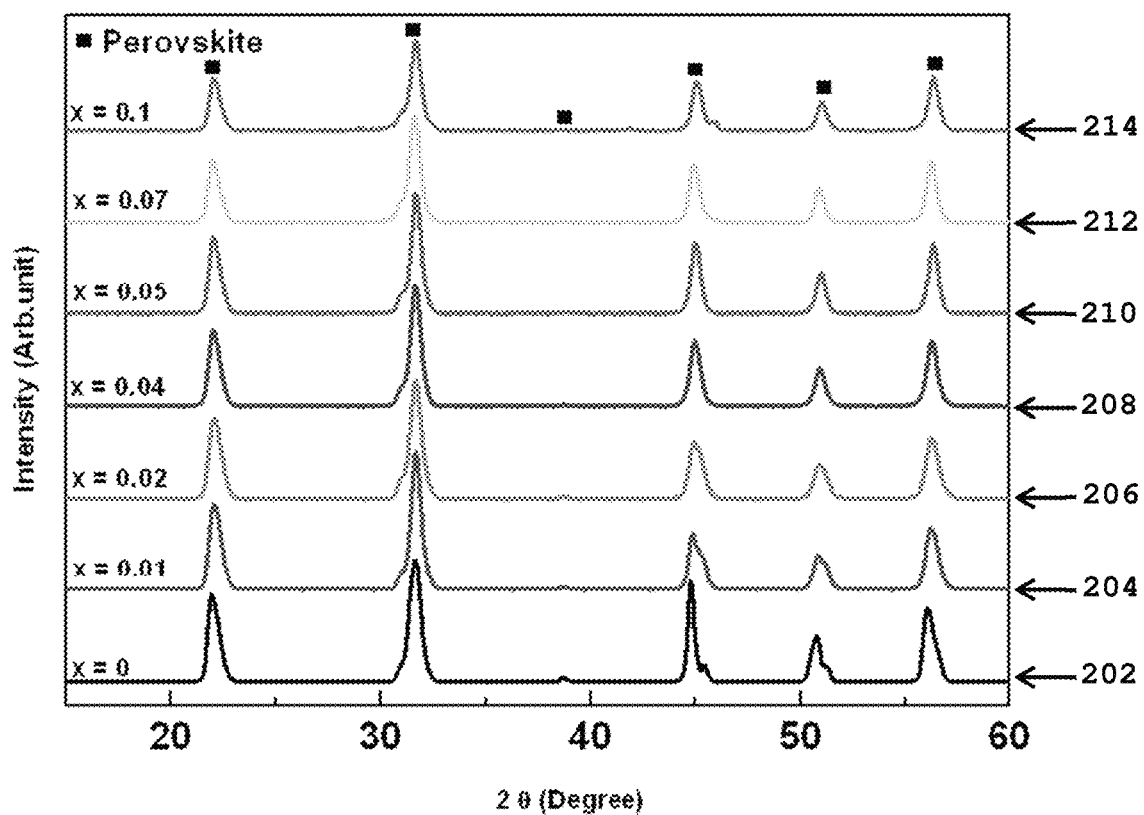
FIG. 2 is a graph showing the X-ray diffraction spectra of the $(K_{0.5}Na_{0.5})_{(1-x)}La_xNb_{(1-2x/5)}O_3$ ceramic material when $0<x<0.1$.

FIG. 2 is a graph showing the X-ray diffraction spectra of the $(K_{0.5}Na_{0.5})_{(1-x)}La_xNb_{(1-2x/5)}O_3$ ceramic when $0<x<0.1$. The filled square boxes indicate where peaks of X-ray diffraction spectrum appear as a perovskite phase. At all values of x measured, that is, when x=0 (202), x=0.01 (204), x=0.02 (206), x=0.04 (208), x=0.05 (210), x=0.07 (212) and x=0.1 (214), the compositions appear to be single phase. Only minor shifts are observed in the peak positions indicating small changes in the lattice parameters. Further, the similarity of the diffraction spectrum to that of perovskite suggests that similarly to perovskite, the 5 mol % La-doped KNN ceramic material also has an $ABO_3$ type crystal structure.

Example 3: Evaluation of the Electro-Optical Property

Figure 3:
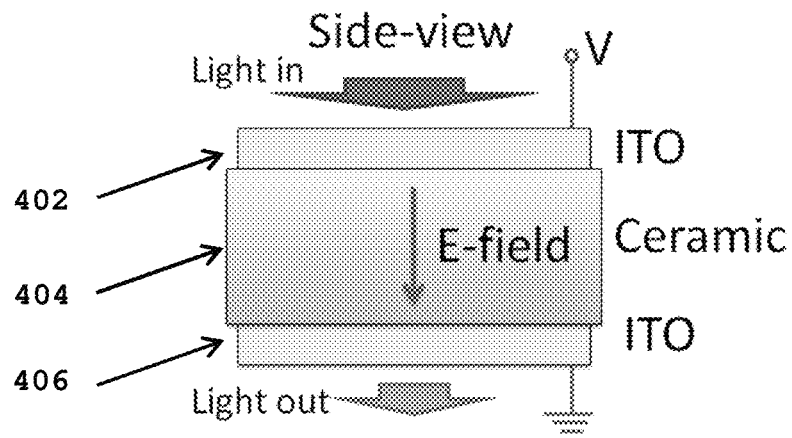
FIG. 3 is a schematic diagram showing the set-up used to evaluate the electro-optical property of the electro-optical device comprising 5 mol % La-doped KNN ceramic material.

The set-up used to evaluate the electro-optical property of the 5 mol % La-doped ceramic material is depicted in FIG. 3. The wavelength of light employed in this experiment ranged from 190 nm to 3200 nm, covering the deep UV-region to the far IR region. The experiment was carried out at room temperature and the incident light was non-polarized. An electrical field was applied across the 5 mol % La-doped KNN ceramic material (404) through indium tin oxide electrodes (402) and (406) deposited on either side of the 5 mol % La-doped KNN ceramic material (404) by magnetron-sputtering at room temperature.

Figure 4:
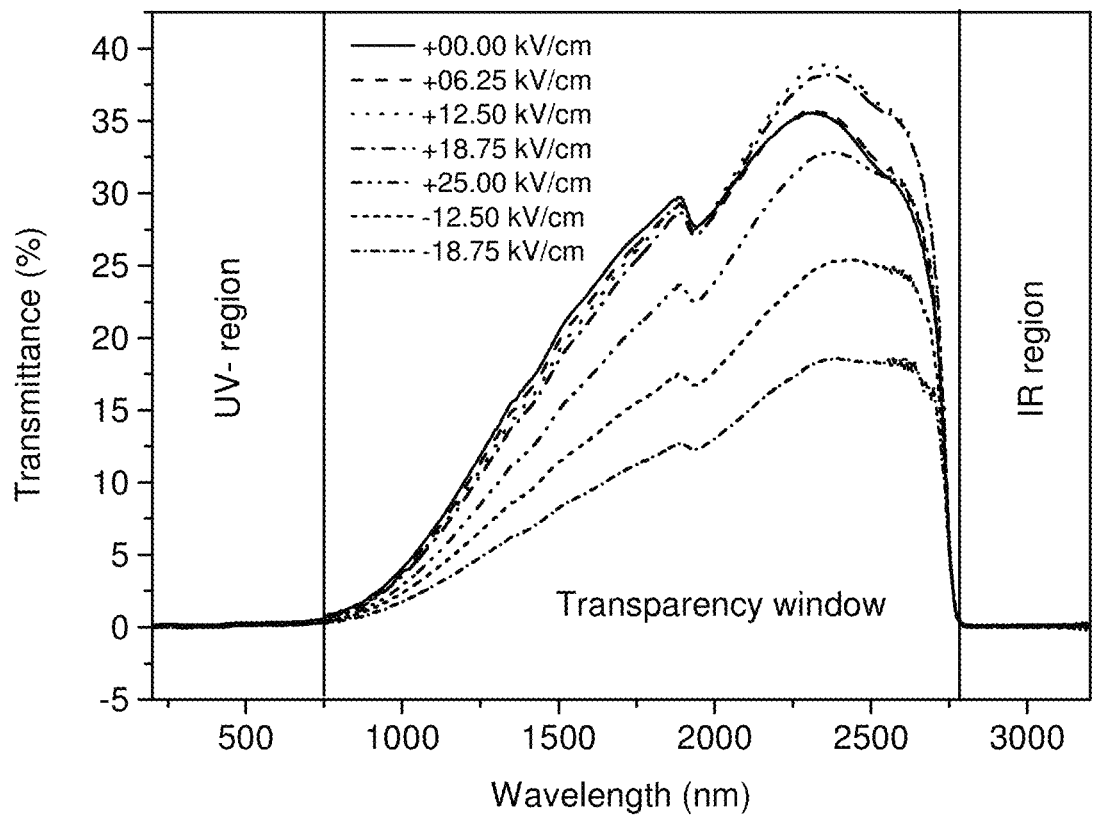
FIG. 4 is a graph showing the IR properties of the electro-optic device comprising the 5 mol % La-doped KNN ceramic material at different voltages.

The observed IR properties of the 5 mol % La-doped KNN ceramic material is depicted in FIG. 4. Light with wavelengths shorter than about 750 nm (in the UV-Vis range), was found to be completely absorbed by the 5 mol % La-doped KNN ceramic material. However, the transmittance was observed to increase as the wavelength of the light increased, until it was observed to sharply decrease at about 2750 nm. Effectively, the 5 mol % La-doped KNN ceramic material was found to have a transparency window in the near IR region. Furthermore, the transmittance of light within the near IR transparency window was found to be tuneable by an external electric field, while maintaining the strong absorbance outside the transparency window. This could be done by applying a bias on the indium tin oxide (ITO) electrode pairs (402) and (406). The tuneability of transparency by applying an electric field or a bias across the electrodes is due to the change in the bifringence in the ceramic material. This in turn changes the unit cell structure and the geometrical bonding arrangements of the atoms within the material, in a reversible process called electrostriction. Beyond a certain threshold of electrostriction, the material may undergo electrical breakdown. In tuning the transmittance of the transparency window, the transmittance was found to increase as the externally applied voltage was increased. Maximum transmittance was observed when a voltage of +12.50 kV/cm was applied, where a 40 percent transmittance was observed at a wavelength of approximately 2250 nm.

The inventive ceramic material is anisotropic and bifringent. Therefore, the polarization in such materials depends on both the direction and the magnitude of the externally applied electric field. The observed maximum transmittance is believed to be due to a change in the refractive index resulting from the maximum polarization in the materials at a particular electric field that is applied.

Figure 5A:
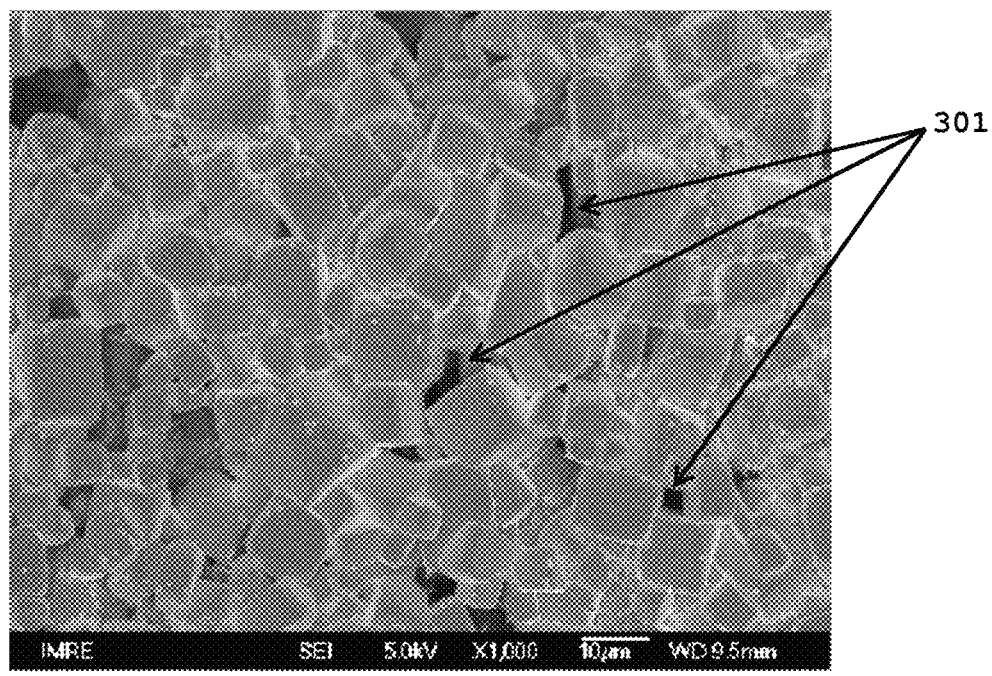
FIG. 5 shows scanning electron microscopy (SEM) micrographs comparing the surface morphology of (a) un-doped KNN and (b) 5 mol % La-doped KNN ceramic materials.

Comparative Example 1: Comparison Between Un-Doped KNN and 5 mol % La-Doped KNN Ceramic Materials FIG. 5(a) shows the SEM micrograph showing the surface morphology of un-doped KNN ceramic material sintered at 1080° C. for 2 hours. The cubical grain sizes are in the range of 10 to 20 microns and are large. In addition, isolated pores (301) are observed which is the likely cause of poor ceramic density.

Figure 5B:
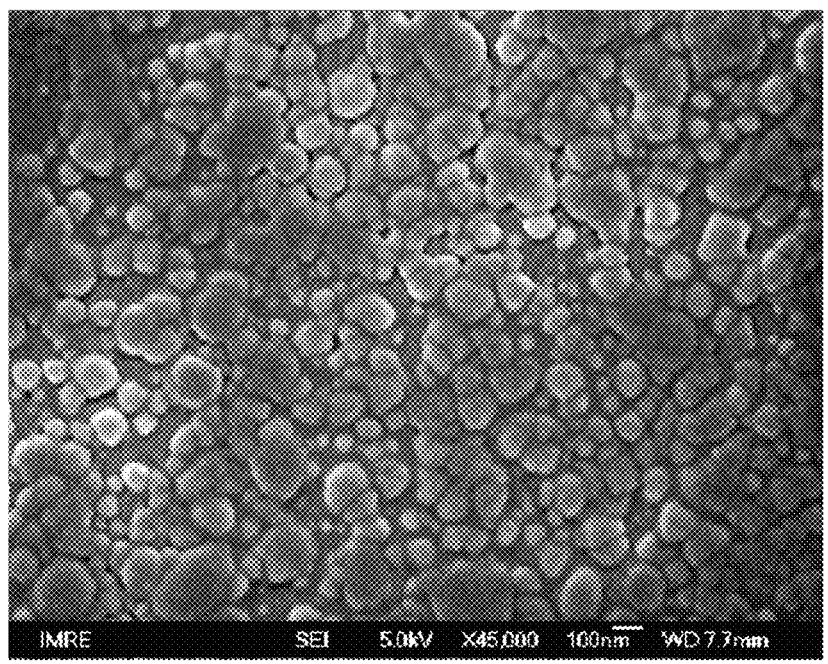

FIG. 5(b) in contrast shows the 5 mol % La-doped KNN ceramic material sintered at 1170° C. for 3 hours. The high transparency observed in the 5 mol % La-doped KNN ceramic material may be attributed to the removal of pores during the sintering process. The presence of La may have contributed to the acceleration of the grain growth. The grains in the 5 mol % La-doped KNN ceramic material was found to be uniformly distributed and the grain boundaries were observed to be much shorter than that observed in un-doped KNN ceramic material. The average value of the grain boundaries in 5 mol % La-doped KNN ceramic material was found to be about 30 to 50 nm while that of the un-doped KNN ceramic material was found to be about 1 micron.

Further, the density of the 5 mol % La-doped KNN ceramic material was found to be higher than that of the un-doped KNN ceramic material. 5 mol % La-doped KNN sintered for 3 hours and 10 hours was found to densities of 97 percent and 99 percent of the theoretical density, respectively. In contrast, the un-doped KNN was found to have a density between 70 percent to 89 percent of the theoretical density. Since the transparency largely depends on the presence of pores in the sintered body, removal of pores in the 5 mol % La-doped KNN ceramic material caused the increase in transparency.

It should be noted that the highest transparency was observed when x=0.05, that is for the 5 mol % La-doped KNN ceramic material with the formula $(K_{0.5}Na_{0.5})_{0.95}La_{0.05}Nb_{0.98}O_3$.

Figure 6:
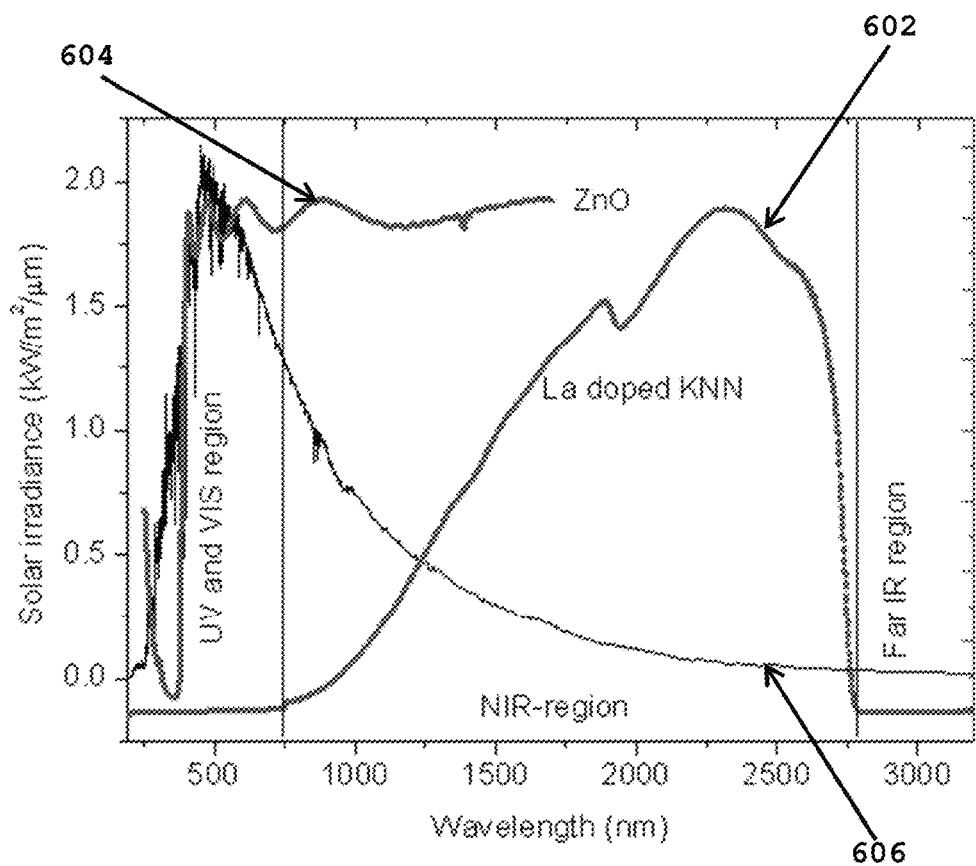
FIG. 6 is a graph comparing the IR properties of the 5 mol % La-doped KNN ceramic material, ZnO and natural solar radiation.

Comparative Example 2: Comparison Between Natural Solar Radiation, ZnO Semiconductor and 5 mol % La-Doped KNN The IR properties of the 5 mol % La-doped KNN (602), ZnO semiconductor (604) and natural solar radiation (606)

in the same wavelength range as Example 3 are compared in FIG. 6. ZnO was chosen as a reference as it is a commonly used transparent semiconductor, which can easily be fabricated into a conductive transparent ceramic or a conductive transparent film. FIG. 6 shows that compared to the ZnO semiconductor, the 5% La-doped KNN is more effective at absorbing wavelengths in the UV-Vis region while transmitting wavelengths in the near IR region of natural solar radiation.

Applications

The disclosed ceramic material comprises La which may improve the densification of the device, leading to better electro-optic properties.

The disclosed ceramic material comprises La in a specified amount which may decrease the overall charge neutrality of the final product.

The disclosed ceramic material may have superior electro-optic properties such as transparency, large and rapid electro-optic response and a wide window of transparency.

The disclosed ceramic material may have a transparency window in the near IR range.

The disclosed ceramic material comprises La which may improve the densification of the device, leading to more facile fabrication of the material.

The disclosed ceramic material may be fabricated using conventional solid-state ceramic synthesis techniques which are not suitable for fabricating conventional KNN-type ceramics.

The disclosed ceramic material may be fabricated at lower temperatures than conventional devices.

The transparency and light-transmittance properties of the disclosed electro-optical device may be tuned by applying an external electric field.

The disclosed electro-optical device may be electrically turned on and off.

The disclosed electro-optical device may act as an electrical switch.

The disclosed electro-optical device may be operable at room-temperature.

The disclosed electro-optic device may lead to cost-savings as it is low-cost to both operate and manufacture than conventional KNN-devices.

Accordingly, the disclosed electro-optic device may be used in numerous applications, including but not limited to, infrared inspection windows (viewports) for IR thermography, UV absorbing materials, optical coating and filter for radiation in the UV to mid-IR range, tuneable optical filters, light shutters, light modifiers and in colour rendering.

Other applications include the use of the disclosed electro-optic device in green buildings, bio-medical applications, food packaging and as a moisture barrier.

In green building applications, the disclosed electro-optic device may be used to tune the inner brightness of a building by applying electric bias across windows coated or made with the disclosed ceramic material.

In food packaging applications, the disclosed electro-optic device may be used to package foods which are sensitive to light. The disclosed ceramic material may be used to limit the transmittance of light through the packaging and allow the food to be stored longer.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A ceramic material having the composition:

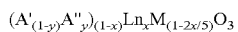

wherein $0<x<0.1$;

$0<y<1$;

A' and A" are independently, alkali metals;

Ln is a lanthanide metal; and

M is a transition metal.

2. The material according to claim 1, wherein Ln is a trivalent lanthanide metal.

3. The material according to claim 1, wherein M is a pentavalent transition metal.

4. The material according to claim 1, wherein $0.04 \leq x \leq 0.07$.

5. The material according to claim 1, wherein $0.4 \leq y \leq 0.6$.

6. The material according to claim 1, wherein the material has an $ABO_3$ type crystal structure.

7. The material according to claim 1, wherein the material has the composition:

$(Na_{0.5}K_{0.5})_{(1-x)}La_xNb_{(1-2x/5)}O_3$ wherein $0<x<0.1$.

8. A method for fabricating a ceramic material comprising the step of contacting alkali metal starting materials, a lanthanide metal starting material, a transition metal starting material and oxygen according to the composition:

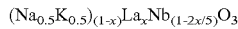

wherein $0<x<0.1$;

$0<y<1$;

A' and A" are independently, alkali metals;

Ln is a lanthanide metal; and

M is a transition metal.

9. The method according to claim 8, wherein Ln is a trivalent lanthanide metal.

10. The method according to claim 8, wherein M is a pentavalent transition metal.

11. The method according to claim 8, wherein $0.04 \leq x \leq 0.07$.

12. The method according to claim 8, wherein $0.4 \leq y \leq 0.6$.

13. The method according to claim 8, further comprising a step of forming a solid solution, and calcining the solid solution at a temperature range of 750° C. to 900° C., wherein the calcination is performed for a duration of 2 hours to 6 hours.

14. The method according to claim 8, further comprising a step of compacting of the solid solution, and sintering the solid solution at a temperature range of 1000° C. to 1350° C., wherein the sintering is performed for a duration of 2 hours to 12 hours.

15. An electro-optical device comprising the ceramic material as claimed in claim 1 or fabricated according to claim 8.

16. The device according to claim 15, further comprising two electrodes on either side of the ceramic material.

17. The device according to claim 15, wherein the optical properties are tunable by applying an external electric field, wherein the tuning comprises increasing the transparency of the material at wavelengths between 750 nm and 2800 nm.

18. The device according to claim 15, wherein the device is operable at room-temperature.

* * * * *

UNITED STATES PATENT AND TRADEMARK OFFICE
CERTIFICATE OF CORRECTION

PATENT NO. : 9,701,585 B2
APPLICATION NO. : 14/765998
DATED : July 11, 2017
INVENTOR(S) : Shannigrahi et al.

It is certified that error appears in the above-identified patent and that said Letters Patent is hereby corrected as shown below:

On the Title Page

Item (30), in "Foreign Application Priority Data", in Column 1, Line 1, delete "201300947" and insert --201300947-7-- therefor In Column 2, item (56) under "Other Publications", Line 2, delete "K0.5Na0.5NbO3" and insert --$K_{0.5}Na_{0.5}NbO_3$-- therefor Item (57), in "Abstract", in Column 2, Line 3, delete "(A'(1-y)A"y)$_{1-x}$Ln$_x$M$_{(1-2X/5)}$O3" and insert --$(A'_{(1-y)}A''_y)_{1-x}Ln_xM_{(1-2X/5)}O_3$-- therefor On page 2, in Column 1, item (56) under "Other Publications", Line 2, delete "(NaK)NbO3" and insert --$(NaK)NbO_3$-- therefor On page 2, in Column 2, item (56) under "Other Publications", Line 5, delete "K0.5Na0.5NbO3" and insert --$K_{0.5}Na_{0.5}NbO_3$-- therefor On page 2, in Column 2, item (56) under "Other Publications", Line 8, delete "(K0.5Na0.5)NbO3" and insert --$(K_{0.5}Na_{0.5})NbO_3$-- therefor On page 2, in Column 2, item (56) under "Other Publications", Line 11, delete "(NaK)Nb03" and insert --$(NaK)NbO_3$-- therefor On page 2, in Column 2, item (56) under "Other Publications", Line 13, delete "(NaK)NbO3" and insert --$(NaK)NbO_3$-- therefor On page 2, in Column 2, item (56) under "Other Publications", Line 16, delete "(NAK) NBO3" and insert --$(NaK)NbO_3$-- therefor Signed and Sealed this
Fourth Day of December, 2018

Andrei Iancu
*Director of the United States Patent and Trademark Office*

CERTIFICATE OF CORRECTION (continued)
U.S. Pat. No. 9,701,585 B2

On page 2, in Column 2, item (56) under "Other Publications", Line 17, delete "(NaK)NbO3" and insert --(NaK)NbO$_3$-- therefor On page 2, in Column 2, item (56) under "Other Publications", Line 20-21, delete "(K0.5Na0.5)NbO3:Pr" and insert --(K$_{0.5}$Na$_{0.5}$)NbO$_3$:Pr-- therefor On page 2, in Column 2, item (56) under "Other Publications", Line 23-24, delete "Na0.5K0.5NbO3" and insert --Na$_{0.5}$K$_{0.5}$NbO$_3$-- therefor